Nov. 2, 1926.
H. W. MORGAN
NAILING MACHINE
Filed Oct. 18, 1924    8 Sheets-Sheet 2
1,605,054
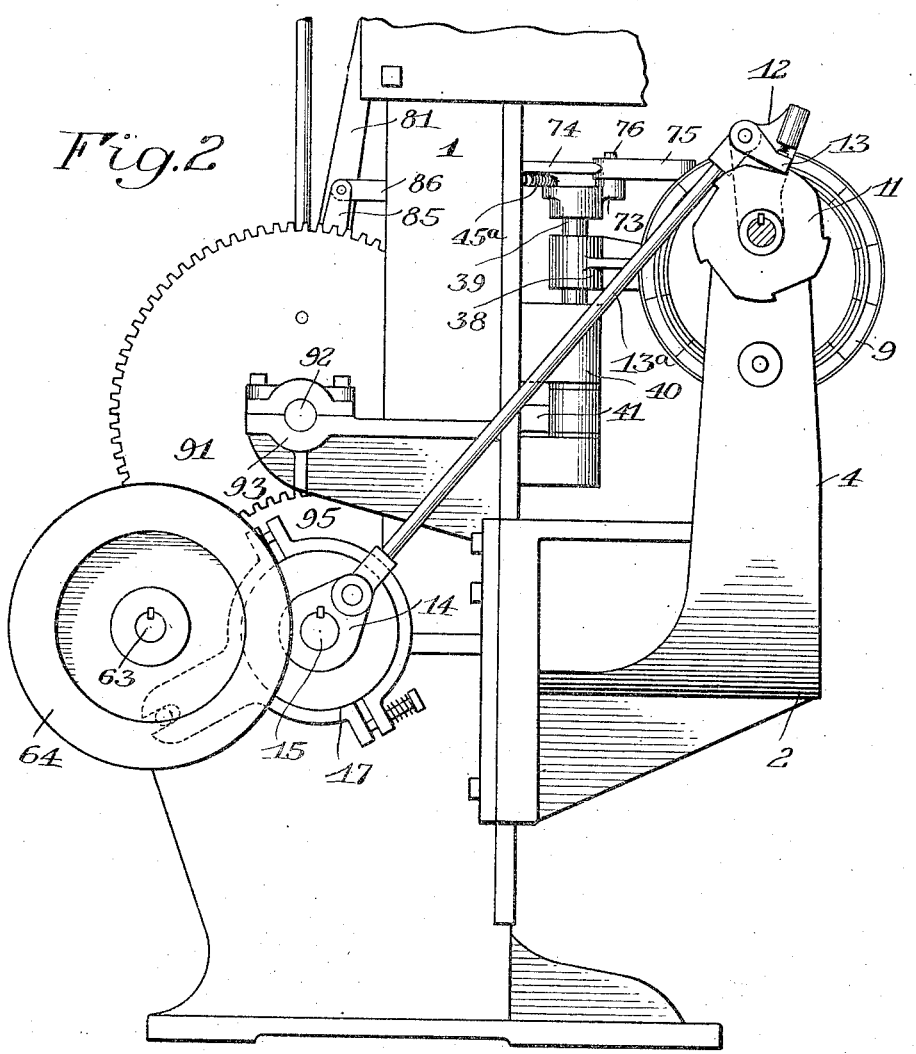
Fig.2
Fig.10
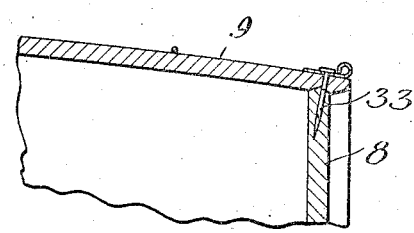
INVENTOR.
Henry W. Morgan
BY
his ATTORNEY

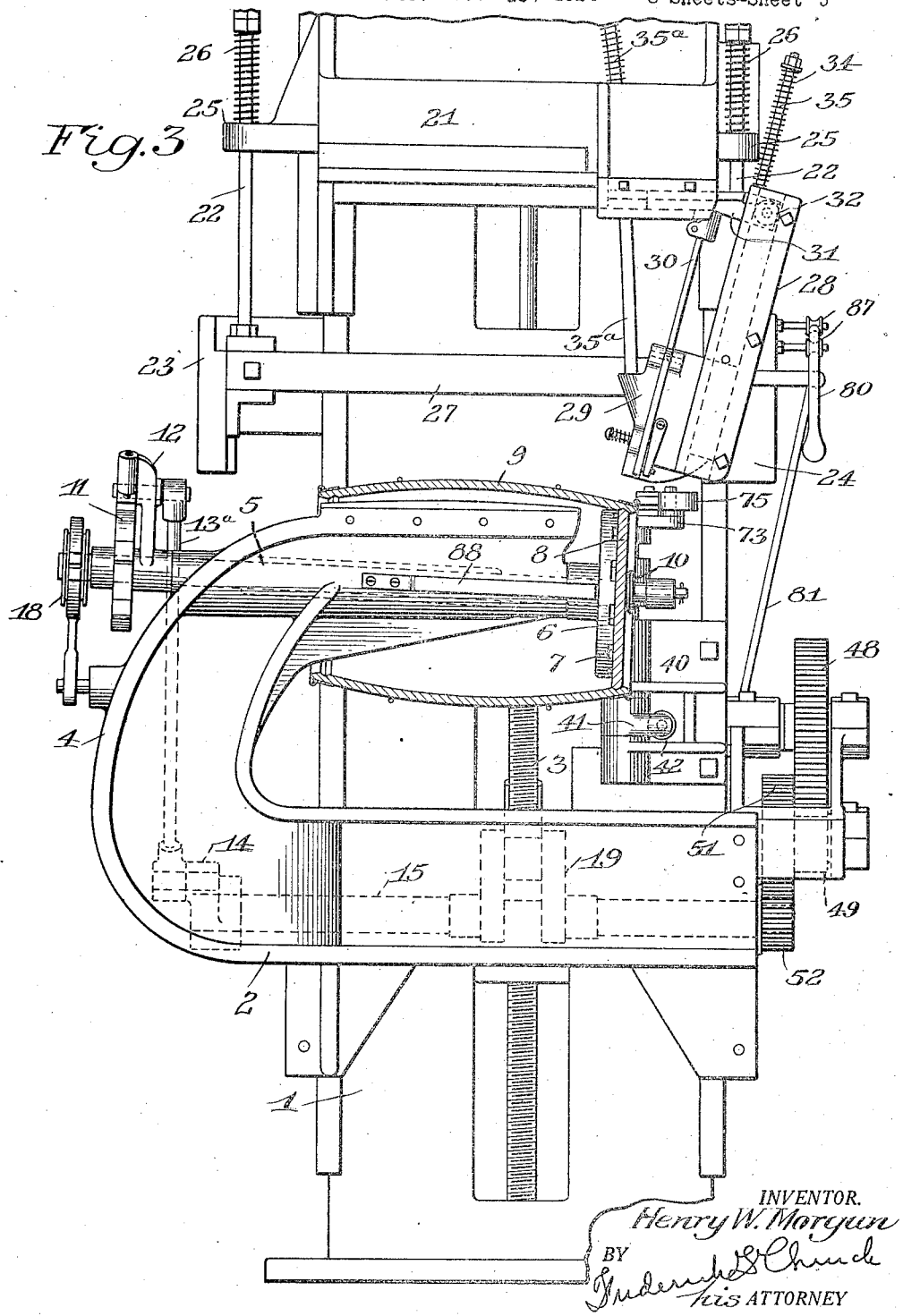

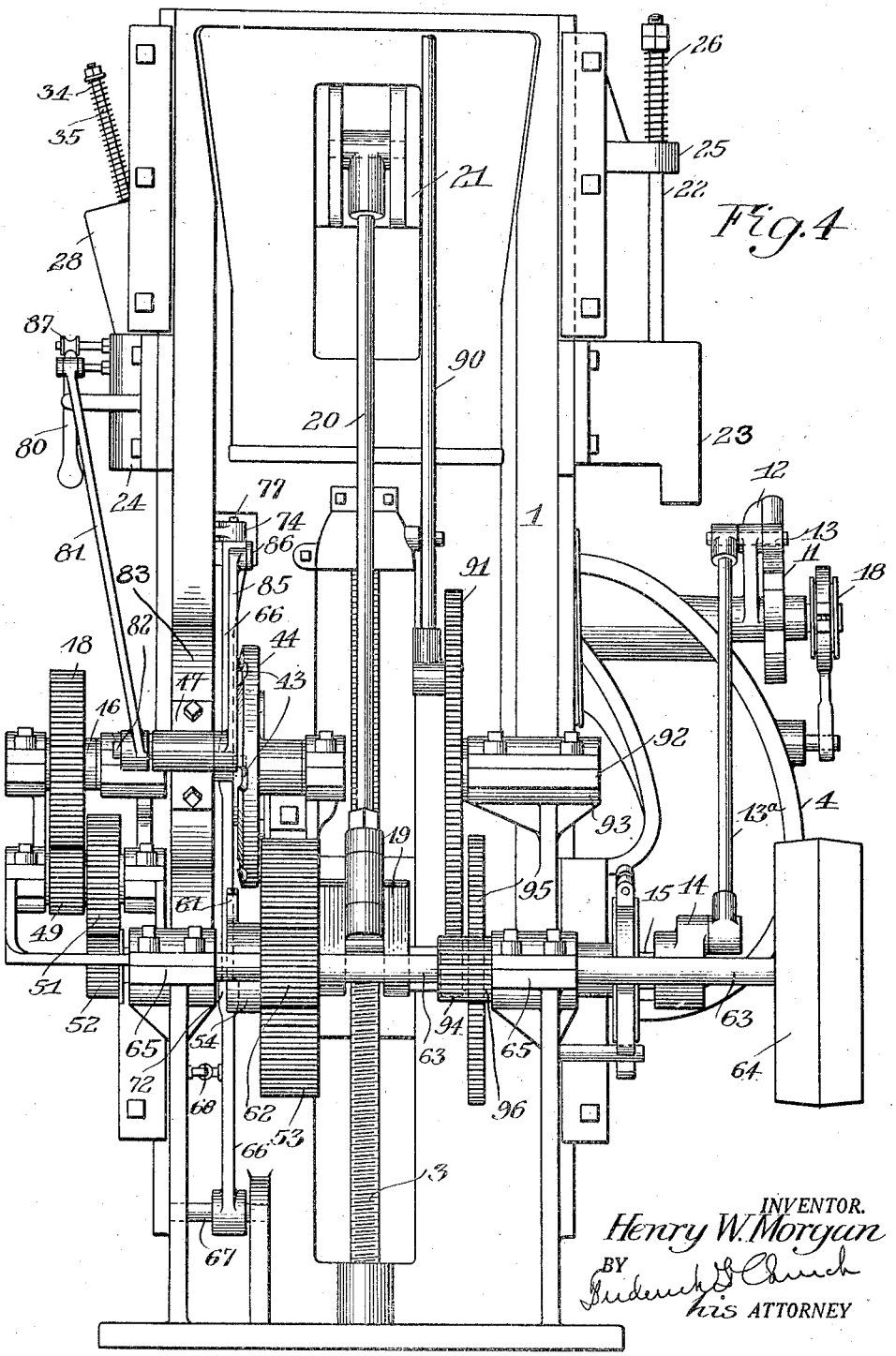

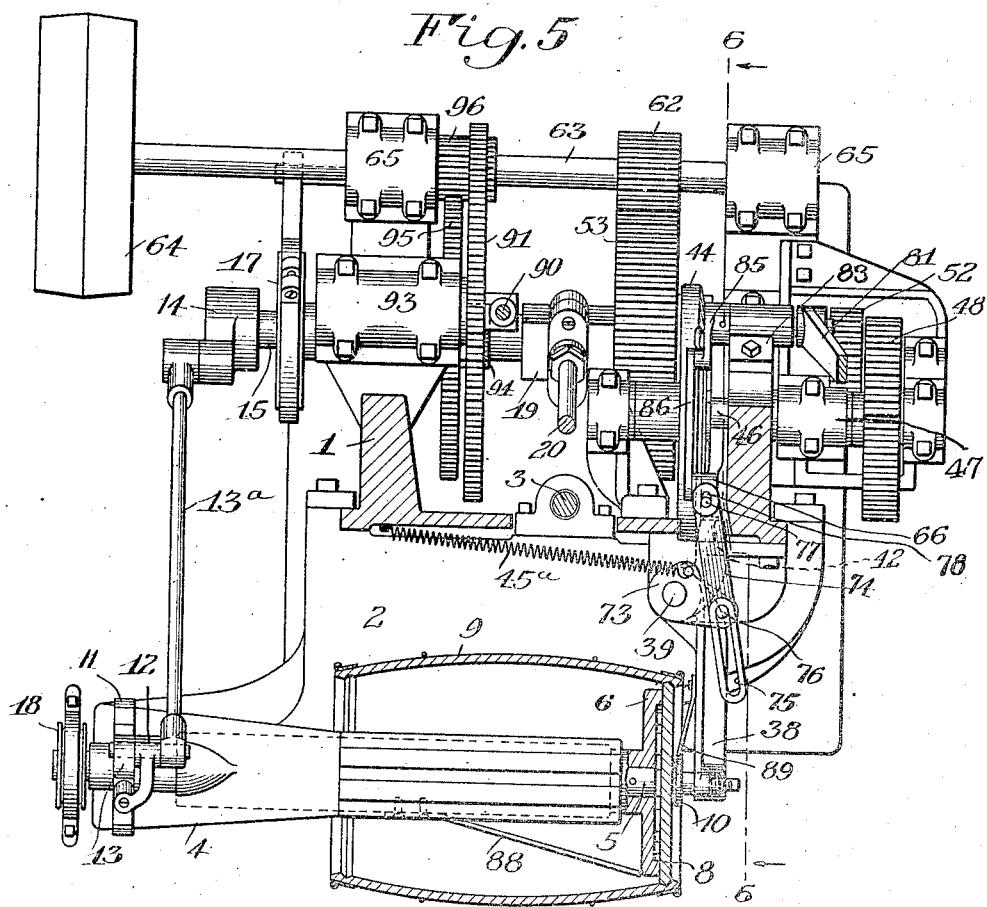
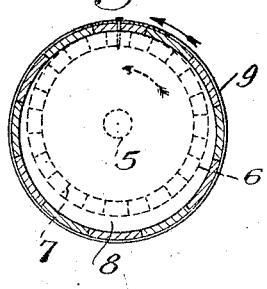
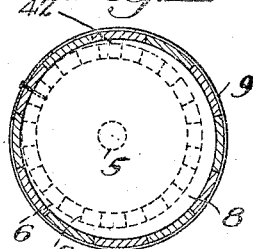

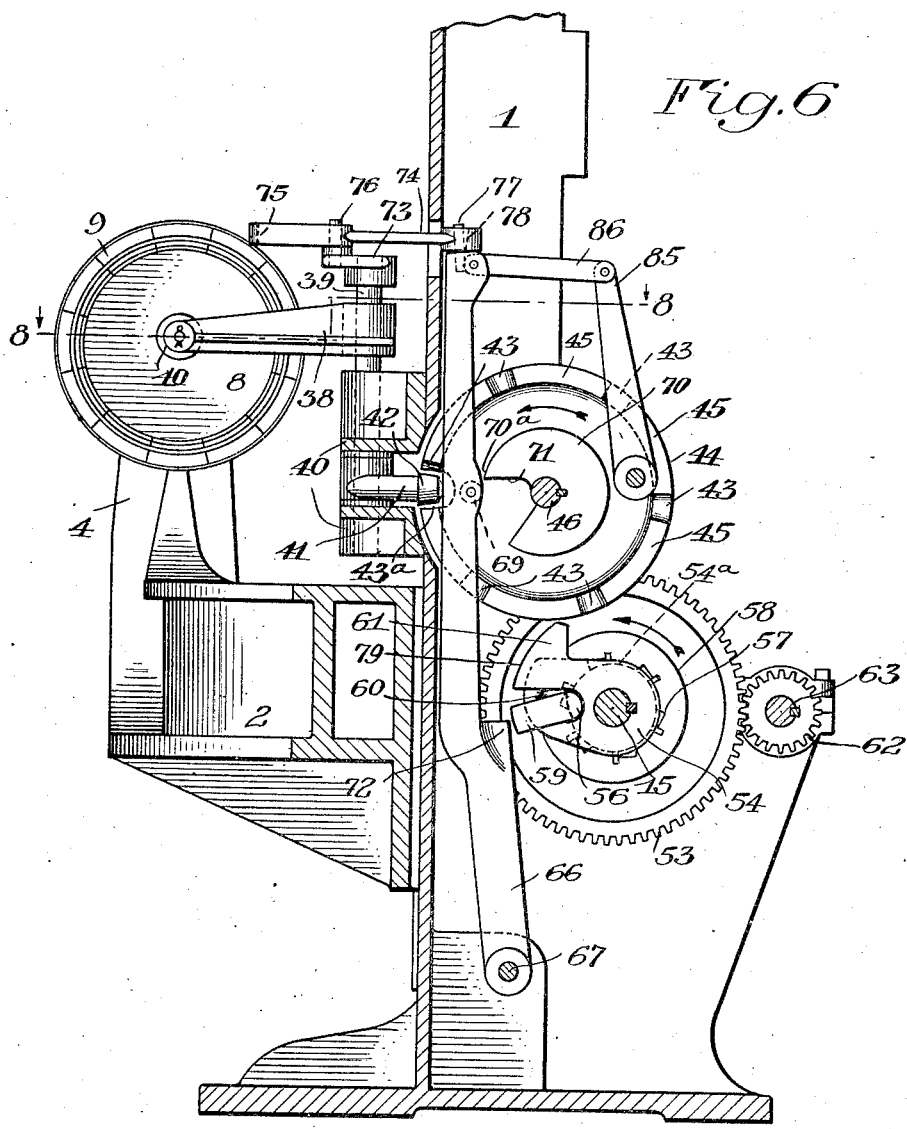

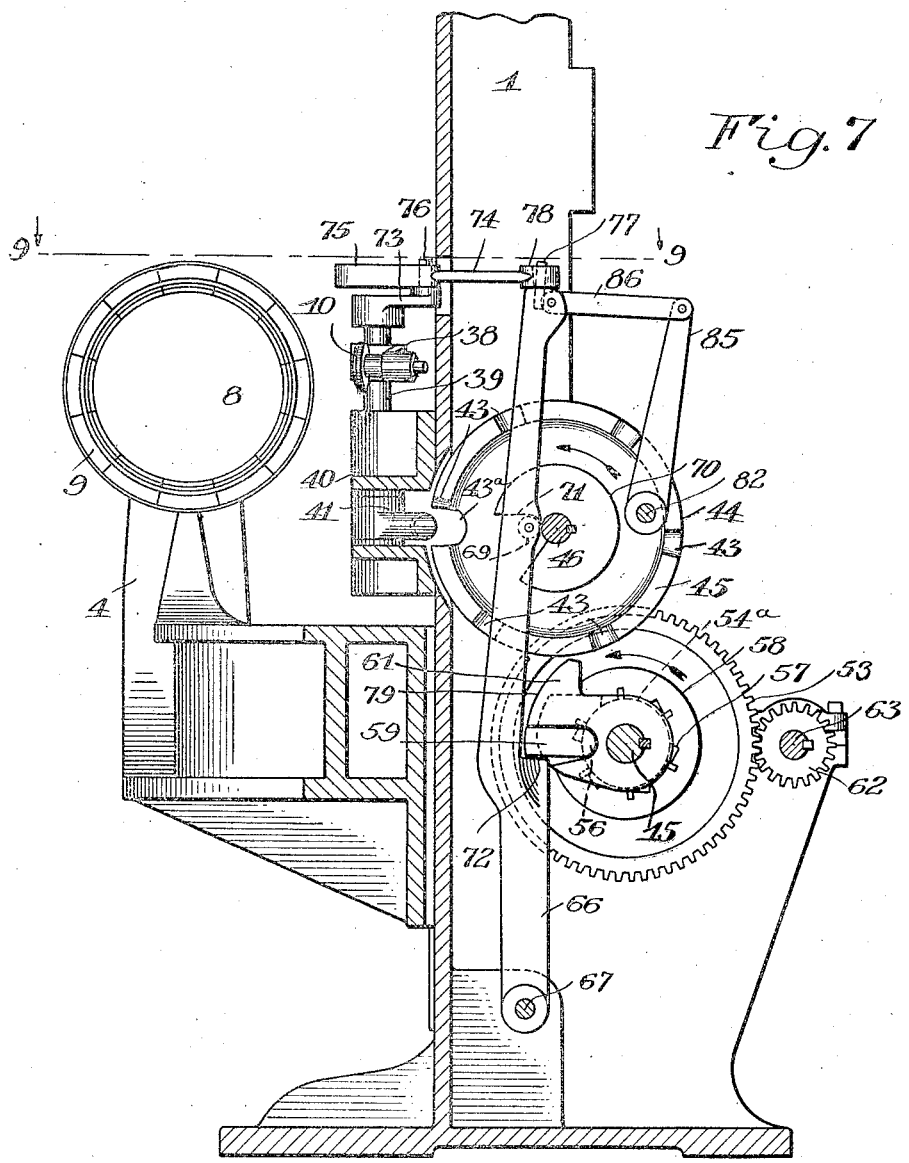

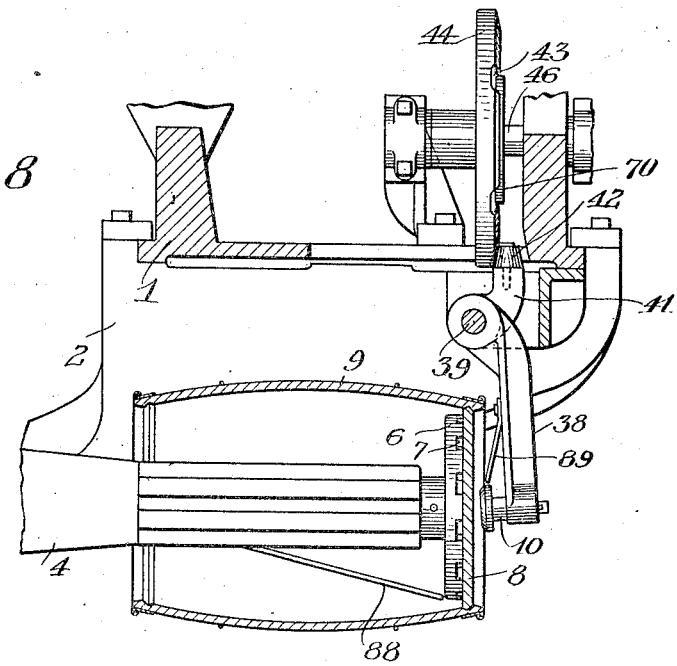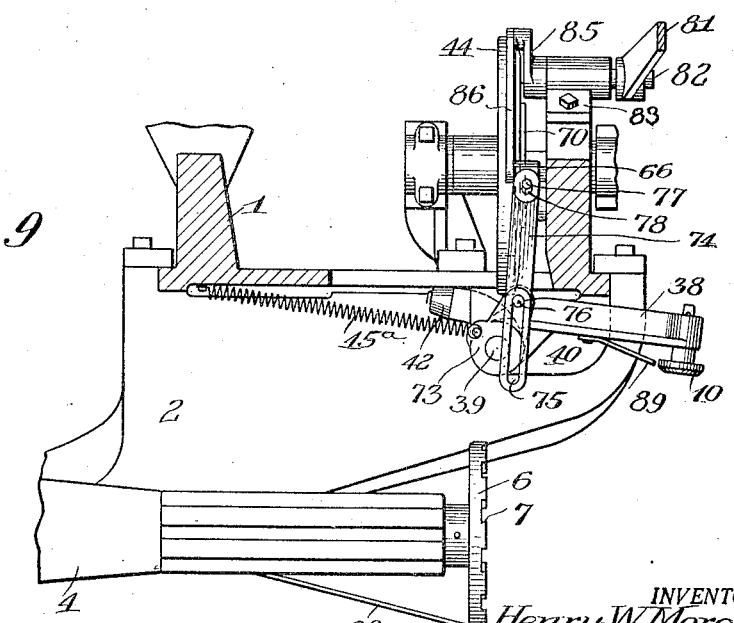

Patented Nov. 2, 1926.

1,605,054

UNITED STATES PATENT OFFICE.

HENRY W. MORGAN, OF ROCHESTER, NEW YORK.

NAILING MACHINE.

Application filed October 18, 1924. Serial No. 744,361.

This invention relates to nailing machines adapted for use in the manufacture of containers, preferably circular shaped containers such as barrels, kegs and the like. The machine is particularly adapted for driving nails to secure the ends or transverse walls of the containers within the bodies thereof, but may be adapted for use in the manufacture of other articles. Generally, the objects of the invention include the automatic advancement of the work, the coordinating of the advancing and nailing operations, the automatic rendering of the machine inoperative when a predetermined cycle of operations is completed, the simplifying of the construction and arrangement of parts, economy in the manufacture and operation of the machines and the rapid completion of the work in a highly satisfactory manner.

To these and other ends the invention resides in certain improvements and combinations of parts, all as will be hereinafter more fully described, the novel features being pointed out in the claims at the end of the specification.

In the drawings:

Figure 2 is a view in elevation looking at the opposite side of the machine;

Figure 3 is a front elevation with the work shown in section;

Figure 4 is a rear elevation;

Figure 5 is a sectional plan taken substantially on line 5—5 of Figure 1;

Figure 6 is a sectional elevation taken substantially on line 6—6 of Figure 5;

Figure 7 is a similar section showing the clutch control mechanism in release position;

Figure 8 is a fragmentary sectional plan taken on the line 8—8 of Figure 6;

Figure 9 is a similar sectional plan showing the gripping means moved to a position to permit the work to be withdrawn from the support;

Figure 10 is a fragmentary sectional view of a barrel or keg showing the relative position of the nails.

Figure 11 is an end elevation showing the relative positions of the keg and anvil during the nailing operation;

Figure 12 is a similar view showing the keg advanced one step, but before release for the next succeeding nailing operation.

Similar reference numerals throughout the several views indicate the same parts.

Figure 1:
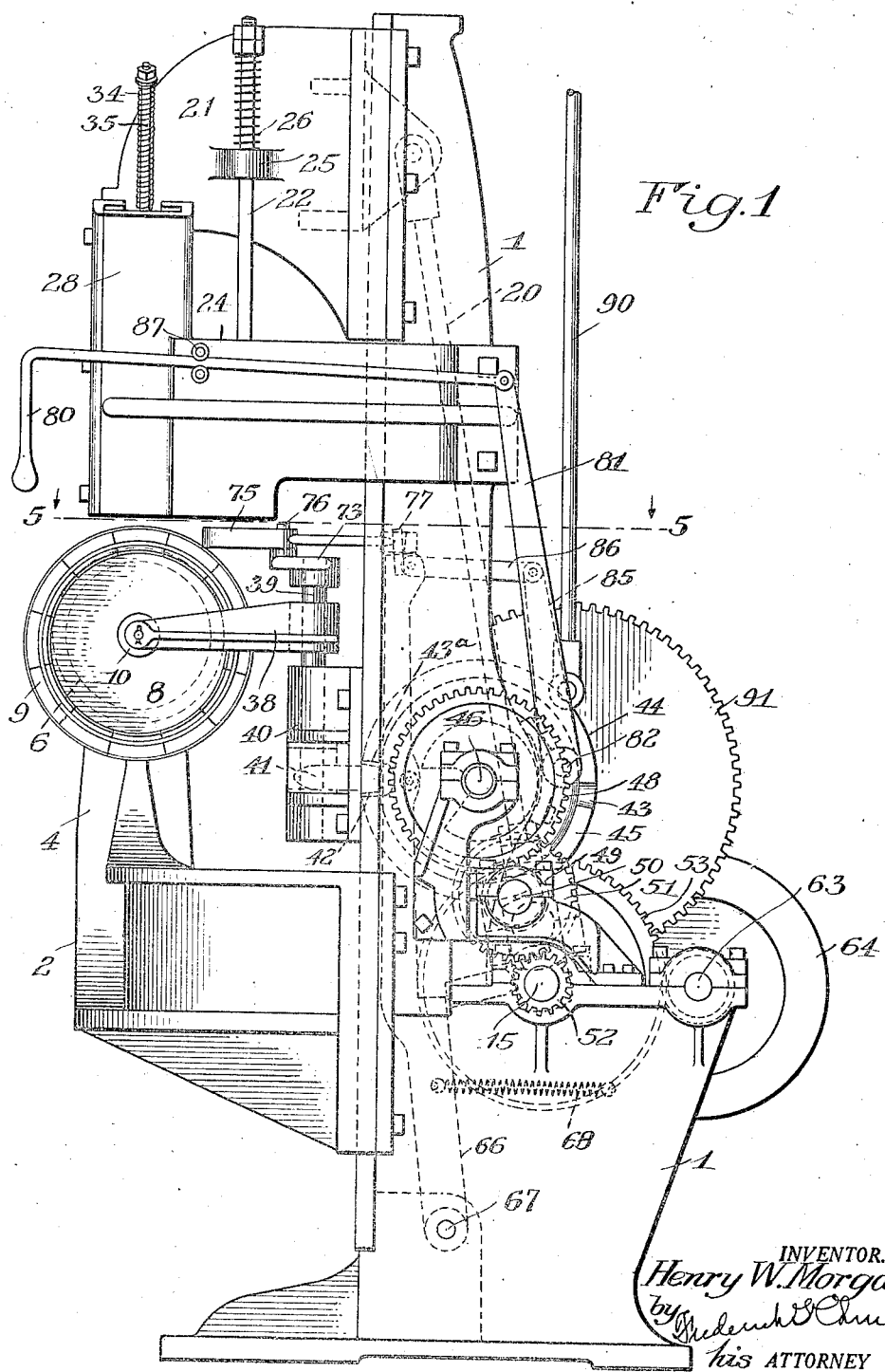
Figure 1 is a side elevation of a machine embodying one form of the invention.

In the present embodiment of my invention I have illustrated a machine having a work support or anvil upon which the operator places the work, such as a keg or barrel, following which he operates a control member to swing a gripping or steadying device into engagement with the work to clamp it upon the support, operation of said control member being adapted also to effect engagement of a driving clutch to start the machine. Before the work support is advanced, which is operated by a pawl and ratchet mechanism driven by a crank shaft, the nailing device, also driven by the crank shaft, is moved down to drive the first nail of a series to be driven in timed relation with the work advancing periods. After each advancing period and before release of the work there is left a space between the keg and the anvil at the nailing point, due to the eccentricity of the axis of the keg with respect to the axis of the rotatable support. In order to present the keg in the desired position upon the anvil for the succeeding nailing operations a properly timed mechanism momentarily effects release of the gripping means immediately following each period of advancement to permit gravity to act in righting the work, whereby to bring it in contact with the anvil at the nailing point before the nail is driven. The gripping mechanism is preferably made to reengage the keg in time to steady it during the nailing operation, which takes place while the keg is at rest, and it is also adapted to cooperate with the support in advancing the keg following the successive nailing operations. Subsequent to the last nailing operation of the cycle, the keg is advanced another step to the point from which the machine begins to function for the next succeeding cycle of operations. At this point the machine is automatically brought to rest by mechanism acting to disconnect the clutch, which mechanism is also effective in moving the gripping device to a position to permit withdrawal of the keg from the anvil, following which, another keg is placed upon the anvil and the machine again started by moving the control means to effect reengagement of the clutch, the succeeding cycles of operations being performed in the same manner.

Referring to the drawings, 1 represents a frame upon which is slidably mounted a carriage 2 adapted for vertical adjustment by a feed screw 3 arranged to be actuated by any suitable means not shown. The carriage 2 is provided with an arm 4 in which is journalled a work spindle 5 carrying an anvil or work support 6 provided with a series of sharp cut projections 7 adapted to engage the inner face of the end member 8 of a keg or barrel 9 which is gripped and held upon the anvil by a work steadying or retaining member 10.

The work spindle 5 is actuated by pawl and ratchet mechanism, including a ratchet wheel 11, an arm 12 loosely mounted on the spindle and having a spring pressed pawl 13 engaging the ratchet wheel, as shown in Figure 2. The arm 12 is pivotally connected with an operating rod 13$^a$ which is connected with a crank arm 14 on a crank shaft 15 journalled in bearings 16 on the back of the frame.

The crank shaft 15 and the work spindle 5 are each provided with a suitable brake, as indicated respectively at 17 and 18. The brakes are adapted to constantly operate to retard the movement of the shafts to prevent their overthrow or movement beyond the desired points of advancement.

The crank shaft 15 is provided with an offset portion 19 with which is connected a pitman 20 pivotally connected at its upper end with a nail driving cross head 21 guided in suitable ways upon the frame. The cross head is also guided upon vertical rods 22 supported by the arms 23 and 24 extending forwardly from the sides of the frame 1. The rods 22 project through extensions 25 on the cross head and upon each of the rods there is seated a spring 26 for yieldably resisting the upward movement of the cross head to check its momentum when raised by the crank shaft. The bars 23 and 24 are connected by a cross bar 27 as shown in Figure 3.

The arm 24 is provided with a guide post 28 upon which is slidably mounted a suitable nailing chuck 29 adapted to be moved into engagement with the keg at the desired point by a plunger 30 carrying a head 31 which is provided with a roller 32 adapted to travel upon the guide post 28. The head 31 is free to slide upon the cross head 21 when the latter is moved downwardly. The plunger operates to first move the chuck into engagement with the keg and thereafter continues to move downwardly to drive the nail through the metal hoop on the keg and into the bottom 8 thereof as indicated at 33 in Figure 10. As soon as the cross head is moved upward the chuck is returned to normal position by a spring 34 on a rod 35 suitably connected with the chuck and extended above the post 28 as shown in Figure 3.

The nails are fed to the chuck through a chute 35$^a$ extending loosely through the cross head 21 by any suitable feeding device well known in the art.

The gripping or work steading member 10 is yieldably mounted on an arm 38 carried by a rock shaft 39 journalled in bearings 40 as indicated in Figure 6, said gripping member being adapted to cooperate with the anvil in advancing the work when the spindle 5 is advanced step by step. The rock shaft is provided with an arm 41 having on its free end a roller 42 adapted to engage in a series of notches or recesses 43 on a timer 44 for effecting the momentary release of the gripper, following each advancing period of the keg, to permit gravity to act in righting the latter when released from the position shown in Figure 12, to which it was advanced when moved one step from the position shown in Figure 11. In the position shown in Figure 12 there is a slight space between the keg and the anvil at the point 42$^a$, due to the fact that the axis of the keg is eccentric to the axis of the anvil. However, as soon as the roller 42 drops into one of the notches 43 of the timer the keg is immediately released and will drop or right itself upon the anvil in a manner to contact therewith at the point at which the next succeeding nail is to be driven or to the same relative position as shown in Figure 11. Immediately following the righting period the gripper 10 is caused to reengage the work to steady the same, both during the nailing and advancing operations. The reseating of the gripper upon the keg is caused by the roller 42 moving out of the notches 43 into engagement with the intermediate portions 45 of the timer, the timer being constantly advanced during the time required to complete each cycle of nailing operations, there being preferably six notches in the timer for the particular size of keg shown. An opening 43$^a$ as indicated in Figure 6 is cut through the timing disk 44 to afford a starting point for the cycle of nailing and advancing operations as well as to permit the arm 38 and gripper 10 to be swung to the position shown in Figure 9 so that the keg may be removed when the nailing operations are completed. The gripper is automatically swung to the release position shown in Figure 9 by the action of the spring 45$^a$ as soon as the opening 43$^a$ of the timing disk is brought into registry with the roller 42. The spring 45$^a$ also acts to yieldingly maintain the roller in engagement with the timing disk during the several periods of advancement of the hoop.

The first nailing operation for each work piece takes place just prior to the engagement of the roller 42 with the timing wheel when the latter is advanced from the position shown in Figure 6 in the direction indicated by the arrow, such engagement being effective to immediately cause the timer to function as a means for holding the gripper in contact with the keg. During this nailing operation the keg remains stationary but is advanced by the pawl and ratchet mechanism immediately following the driving of the nail or when the chuck is moved out of engagement with the keg. The succeeding nailing operations take place just subsequent to the movement of the roller out of the several notches 43 into engagement with the surfaces 45 of the wheel, the keg advancing periods following the nailing operations while the surface 45 is still in engagement with the roller and the release of the gripper following when the notches are moved into registry with the roller. In other words, both the nailing and keg advancing operations take place while the wheel is being advanced a distance equal to that between the notches. It will be understood of course that the several mechanisms are timed to produce the different operations in the manner described above.

The timing wheel is mounted on a short shaft 46 journalled in a bearing 47 on the frame and carries a gear 48 meshing with a pinion 49 on the shaft 50, the pinion being connected with a gear 51 which meshes with a pinion 52 on the crank shaft 15 as shown in Figure 1.

The crank shaft is provided with a gear 53 operated by a suitable clutch, indicated generally at 54 which includes a locking key 56 inserted in a semi-circular recess formed in a bearing 54ª keyed on the shaft 15 and adapted to engage in one of a series of notches 57 on the sleeve 58 of the gear 53, the sleeve being rotatably mounted on the bearing 54ª. The key 56 is provided with an arm 59 operated by a spring 60 engaging another arm 61 of the clutch whereby the key is moved to engage in one of the notches 57 as shown in Figure 6. The gear 53 is constantly driven by a pinion 62 on a drive shaft 63 having a pulley 64 adapted to be driven by any suitable power means, the shaft 63 being journalled in suitable bearings 65 on the back of the frame as indicated in Figure 4.

The ratio of the gearing between the crank shaft 15 and the timer shaft 46 is such that the timer makes only one revolution for every six revolutions of the crank shaft.

Due to the eccentricity of the axis of the keg with respect to that of the anvil the distance advanced by the latter for each nailing operation is greater than the net advance of the keg, since when the anvil is brought to rest with the keg in the position shown in Figure 12 and the keg released, there will be a certain amount of slippage or turning of the latter about the axis of the anvil in a clockwise direction, as the overhand of the keg on the right side of the axis is greater than on the left. The slippage of the keg in this manner has the effect of shortening the distance through which it is advanced. The preferred method of overcoming the total loss in distance advanced by the keg is to decrease the number of notches on the ratchet wheel 11 by one, which has the effect of giving the desired spacing between the nails, or in other words, over advancing the keg each time an amount equal to the loss by slippage when the keg is released, following the different periods of advancement.

Control of the clutch and of the gripping device to swing it from the position shown in Figure 9 to that shown in Figure 6 is effected by a lever 66 pivoted at 67 and provided with a spring 68 for automatically moving the lever to clutch releasing position as shown in Figure 7, when the opening 43ª of the timer 44 is moved into registry with the roller 42 on the rock shaft arm 41. The lever 66 during the operation of the machine through each cycle of operations is held in the position shown in Figure 6 by a roller 69 travelling on a disk 70 which is suitably connected with the timing wheel 44, the disk being provided with a notch 71 into which the roller drops to effect release of the lever when the parts are in the position shown in Figure 6. The lever carries a projection 72 which moves under the arm 59 of the clutch locking pin 56 when the roller 69 moves into the notch 71 of the disk 70. In this manner the lever effects release of the clutch locking pin to stop the operation of the machine at the end of each cycle of advancement and the roller 69 forms a stop for the timing wheel to prevent overrunning of the same. When the lever is moved to the position shown in Figure 7, it permits the spring 45ª to move the gripping device to the position shown in Figure 9. Previous to this time it maintained the rock shaft 39 in the position shown in Figure 6 through the medium of a crank arm 73 on the upper end of the rock shaft and a link 74 having an elongated opening 75 in which is disposed a pin 76 on the crank arm, the opposite end of the link being connected with the upper end of the lever 66 by a pin 77 which projects into a tapered opening 78 of the link. The slot 75 of the link permits movement of the lever 66 independently of the movement of the crank arm 73 and the tapered opening 78 permits free angular movement of the lever with respect to the link. Since the timer, when in the position shown in Figure 6 is not in engagement with the roller it is ineffective as a means for causing the gripper to engage the work at the initial starting operation of the machine. To insure engagement of the work by the gripper before the timer moves into engagement with the roller 42, the clutch arm 61 is provided with a curved portion 79, which immediately upon starting the machine, is advanced to engage the projection 72 on the lever 66, and the latter, through the medium of the link 74 and crank arm 73 causes the gripper to be urged into engagement with the work to steady it upon the anvil. The clutch portion 79, which moves six times faster than the timer 44 will engage the lever projection 72 shortly after the lever has been moved by the operator to the position shown in Figure 6. While the curved portion 79 of the clutch arm 61 is in engagement with the projection 72 of the lever, it is effective as a means for causing the link 74 to hold the crank arm 73 in position to keep the gripper 10 in engagement with the keg, as indicated in Figures 5 and 6. During this time the point 70ᵃ of the disc 70 will have passed the roller 69 so that thereafter the disc will engage the roller to prevent the spring 68 from moving the lever 66 into position to disconnect the clutch before the cycle of operations is completed.

Reengagement of the clutch and movement of the gripping means into engagement with the work is effected by manually moving the lever from the position shown in Figure 7 to that shown in Figure 6. This operation is performed by pulling forward a rod 80 which is connected with the upper end of an arm 81 rigid on a shaft 82 journalled in a bearing 83 on the frame, the shaft carrying at its outer end another upstanding arm 85 which is connected with the clutch control lever 66 by a link 86 as shown in Figure 6, the rod being guided between the rollers 87 which are suitably connected with the arm 24 as shown in Figures 1 and 3.

In order to facilitate the removal of the keg from the anvil, I have secured upon the arm 4 a guard 88 adapted to direct the key outwardly from the machine in a path at an angle to the axis of the spindle. A similar guard 89 is placed on the gripper supporting arm 38 and serves to prevent interference by the gripper with the removal of the keg.

The nail feeding mechanism and the container or hopper for supplying the nails thereto, not shown, may be of any suitable construction well known in the art both mechanisms being preferably operated from the crank shaft 15. The container is adapted to be agitated by a pitman 90 driven by a gear 91 on a short shaft 92 journalled in a bearing 93, the gear being driven by a pinion 94 loosely mounted on the crank shaft and carrying a gear 95 connected therewith and adapted to be driven by a pinion 96 on the drive shaft 63, all as indicated in Figures 1 and 4.

I claim as my invention:

1. In a nailing machine, the combination of a work support embodying a rotatable element adapted to engage the work and a device for clamping the work thereon during the advancing operations thereof, means for operating the rotatable element to automatically advance the work step by step, a nailing device adapted to periodically effect the driving of the nails into the work at predetermined distances apart, and means for automatically releasing the clamping device after each advancing operation.

2. In a nailing machine, the combination of a work support embodying relatively movable members adapted to engage the end wall of a container on opposite sides thereof during advancement of said container, means for automatically moving one of said members to complete a cycle of work advancing operations, means for automatically moving the other of said members to release the work subsequent to each advancing operation, a nailing device, and means for actuating said nailing device to effect a predetermined number of nailing operations during said cycle of advancement.

3. In a nailing machine, the combination of a work support including relatively movable members adapted to engage one of the walls of a container on opposite sides thereof during advancement of the container, means for automatically moving one of said members to complete a cycle of work advancing operations, means for automatically moving the other of said members to release the work subsequent to each advancing operation, and a nailing device including operating means timed to effect the nailing operations at intervals affording substantially equal spaces between the nails during the period covering a complete cycle of advancement.

4. In a nailing machine, the combination of a work support including a spindle having a head adapted to engage one of the walls of a container and a clamping device for the container on the opposite side of said wall adapted to engage the latter during advancement of said container, means for automatically moving the spindle to advance the work step by step, means for automatically swinging the clamping device to release position subsequent to each work advancing operation, and a nailing device including actuating means timed to effect the nailing operations in unison with the step by step advancement of the work.

5. In a nailing machine, the combination of a work support including a spindle having a head adapted to engage one of the walls of a container, clamping means on the opposite side of said wall for clamping it upon said head during advancement of the latter, means adapted to automatically move the spindle to effect advancement of the work, a nailing device movable in a path at an angle to said spindle, means for operating the nailing device to apply the nails to the work at predetermined distances apart, and means for automatically releasing the clamping device subsequent to each advancing operation.

6. In a nailing machine, the combination of a work support including separate devices for engaging the work on opposite sides thereof during advancement of the same, actuating means for periodically moving one of the devices to advance the work step by step, means timed to automatically move the other device to release position subsequent to each advancing operation, a nailing device, and means adapted to automatically operate said actuating means and said nailing device in a manner to effect the nailing operations in unison with the step by step advancement of the work.

7. In a nailing machine, the combination of a work support including a revoluble element having a head extending transversely to its axis and adapted to engage the end wall of a container, means adapted to automatically advance said revoluble element to present different portions of the work at a common nailing point, means for clamping said end wall on said head during advancement thereof, a nailing device adapted to periodically drive nails into the work at said point, and means timed to automatically release said clamping means subsequent to each advancing operation.

8. In a nailing machine, the combination of a work support including two relatively movable members adapted to engage a work piece on opposite sides thereof during advancement of the same, a nailing device, mechanism adapted to automatically move one of said members to advance the work step by step, mechanism adapted to actuate the nailing device in unison with the work advancing periods, and means timed to effect automatic release of the other of said members following each advancing operation.

9. In a nailing machine, the combination of a work support including two separate members adapted to engage a work piece on opposite sides thereof and cooperating to support it during advancement of the same, a nailing device, mechanism adapted to automatically move one of said members to advance the work step by step, actuating means for the nailing device timed to effect the driving of the nails between the work advancing periods, and means timed to move the other of said members to release the work subsequent to each advancing operation.

10. In a nailing machine, the combination with a work support and a nailing device, of means for automatically advancing the support step by step, gripping means rotatably engaging and adapted to automatically release the work after each advancing operation, and means for operating the nailing device in unison with the means for advancing the support.

11. In a nailing machine, the combination with a work support and a nailing device, of means for automatically advancing the support step by step, gripping means rotatably engaging the work and adapted to cooperate with the support in effecting the advancing operations and arranged to automatically release the work after each advancing operation, and means for operating the nailing device to effect the first nailing operation before advancement of the work and the remaining nailing operations between the advancing periods.

12. In a nailing machine, the combination with a work support and a nailing device, of means for automatically advancing the support, gripping means rotatably engaging and adapted to cooperate with the support in effecting the advancement of the work, said gripping means being adapted to move to a position to permit withdrawal of the work from the support when the nailing operations are completed, and means for actuating the nailing device to periodically drive the nails at predetermined intervals.

13. In a nailing machine, the combination with a rotatable work support and a nailing device, of means adapted to automatically impart a step by step movement to the support to advance the work about the axis thereof, means for steadying the work upon the support during the advancing periods, means adapted to move said last mentioned means to release the work to permit it to be shifted by gravity following the several periods of advancement, and actuating means for said nailing device adapted to effect the nailing operations in unison with the advancing operations.

14. In a nailing machine, the combination with a work support, of means adapted to automatically move the support to advance the work step by step, retaining means adapted to steady the work upon the support during the advancing periods, automatic means adapted to cause said retaining means to periodically release and reengage the work, said release permitting movement of the work relative to the support for the successive nailing operations, and mechanism timed to drive the nails preceding each period of advancement.

15. In a nailing machine, the combination with a work support, of means adapted to automatically move the support to advance the work step by step, retaining means adapted to steady the work upon the support during the advancing periods, controlling means adapted to cause said retaining means to periodically release and reengage the work, said release permitting movement of the work relative to the support for the successive nailing operations, said controlling means being also adapted to hold the retaining means in engagement with the work during the nailing operations, and mechanism timed to drive the nails during said intervals.

16. In a nailing machine, the combination with a work support, of means adapted to automatically move the support to advance the work step by step, retaining means adapted to steady the work upon the support during the advancing periods, controlling means adapted to cause said retaining means to periodically release and reengage the work, said release permitting movement of the work relative to the support for the successive nailing operations, said controlling means being also adapted to move the retaining means to a point permitting withdrawal of the work from the support when the nailing operations are completed, and mechanism timed to drive the nails preceding the several periods of advancement.

17. In a nailing machine, the combination with a rotatable work support, of automatic means adapted to effect rotation of the support to afford a step by step advancement of the work, retaining means adapted to steady the work upon the support during the advancing periods and arranged to periodically release and reengage the work, said release permitting movement of the work relative to the support for the successive nailing operations, and mechanism timed to drive the nails into the work preceding each period of advancement.

18. In a nailing machine, the combination with a rotatable work support, of automatic advancing means adapted to effect rotation of the support to afford a step by step advancement of the work, retaining means for steadying the work upon the support during the advancing operations, controlling means for said retaining means adapted to periodically effect momentary release of the latter to permit movement of the work relative to the support following the successive advancing operations, and a nailing device timed to operate in unison with said advancing means.

19. In a nailing machine, the combination with a rotatable work support and a nailing device, of automatic means for moving the support to effect a step by step advancement of the work, a rock shaft, a gripper mounted thereon and adapted to steady the work upon the support during the advancing operations, an arm extending from the rock shaft, a rotatable timing member for controlling the gripper adapted to engage the arm to hold the gripper in contact with the work, said member having a series of recesses adapted to successively receive the arm to permit release of the gripper following each step of advancement of the work, means for causing the arm to yieldingly engage said member, actuating means for said member, and means adapted to operate said nailing device in unison with the step by step advancement of the work support.

20. In a nailing machine, the combination with a rotatable work support and a nailing device, of automatic means for moving the support to effect a step by step advancement of the work, a rock shaft, a gripper mounted thereon and adapted to steady the work upon the support during the advancing operations, an arm extending from the rock shaft, a rotatable timing member adapted to engage the arm to hold the gripper in contact with the work, said timing member having a series of recesses adapted to successively receive the arm to permit release of the gripper following each period of advancement of the work, the last recess of the series permitting movement of the arm to a point allowing the rock shaft to swing the gripper to a position to permit withdrawal of the work from the support, yieldable means for moving the rock shaft to swing the arm to the last mentioned position and to maintain it in engagement with the timing member during advancement thereof, actuating means for said timing member, means for causing said actuating means to discontinue movement of the timing member when the last recess of said series is moved into registry with the arm, and operating means for said nailing device timed to effect the nailing operations in unison with the work advancing operations.

21. In a nailing machine, the combination with a rotatable work support and a nailing device, of means for automatically advancing the work support step by step through a predetermined cycle of operations, means for gripping and steadying the work upon the support during the advancing periods, a timing device for controlling said gripping means arranged to effect release of the latter following each period of advancement of the work, actuating means for said timing device, means adapted to automatically render the actuating means ineffective when the cycle of advancing operations is completed, and means for actuating said nailing device in unison with said work advancing means.

22. In a nailing machine, the combination with a rotatable work support and a nailing device, of means for automatically advancing the support step by step through a predetermined cycle of operations, means for gripping and steadying the work upon the support during the advancing periods, a timing device for controlling said gripping means arranged to effect release of the latter following each period of advancement of the work, driving means for said timing device including a gear and a clutch normally coupled with the gear, means adapted to automatically effect release of the clutch when said cycle of operations is completed, manually operable means for resetting said clutch to effect starting of the machine, and means for actuating said nailing device in unison with said work advancing means.

23. In a nailing machine, the combination with a rotatable work support and a nailing device, of means for automatically advancing the support step by step through a predetermined cycle of operations, means for gripping and steadying the work upon the support during the advancing periods, a timing device for controlling said gripping means arranged to effect release of the latter following each period of advancement of the work, driving means for said timing device including a gear and a clutch normally coupled with the gear, means adapted to automatically effect release of the clutch when said cycle of operations is completed, said means being also adapted to move the gripping means to a position to permit the work to be withdrawn from the support, manually operable means for resetting said clutch to effect starting of the machine, and means for actuating said nailing device in unison with said work advancing means.

24. In a nailing machine, the combination with a rotatable work support and a nailing device, of automatic means adapted to move the support to advance the work step by step, a gripping device for steadying the work upon the support during the advancing periods, control means for said gripping device including a rotatable element adapted to release the gripping device subsequent to each advancing operation, driving means for said rotatable element including a shaft having a gear thereon and a releasable clutch normally connecting the gear with said shaft, means adapted to automatically release the clutch, said means being also adapted to prevent overrunning of said rotatable element when the clutch is disconnected, manually controlled means for moving said last mentioned means to normal inoperative position, and means for operating said nailing device in unison with the work support advancing means.

25. In a nailing machine, the combination with a rotatable work support and a nailing device, of automatic means adapted to move the support to advance the work step by step, a gripping device for steadying the work upon the support during the advancing periods, control means for said gripping device including a rotatable element adapted to release the gripping device subsequent to each advancing operation, driving means for said rotatable element including a clutch, means adapted to automatically disengage the clutch and to prevent overrunning of said rotatable element, and means for actuating said nailing device in unison with the work support advancing means.

26. In a nailing machine, the combination with a rotatable work support and a nailing device, of automatic means adapted to move the support to advance the work step by step through a predetermined cycle of operations, a gripping device for steadying the work upon the support during the advancing periods, control means for said gripping device including a rotatable element adapted to effect release of the gripping device subsequent to each advancing operation, driving means for said rotatable element including a clutch, a clutch releasing device adapted to automatically disconnect the clutch at the end of said cycle of operations and adapted also to prevent overrunning of said rotatable element when its driving means is rendered ineffective, said clutch release device being normally held inoperative by said rotatable element, the latter being constructed to permit movement of the clutch release device when the machine has completed a cycle of operations, and means for actuating said nailing device in unison with the work advancing operations.

27. In a nailing machine, in combination, an automatic barrel advancing mechanism including a support for the barrel adapted to be rotated step by step to complete a cycle of operations, means adapted to steady the barrel upon the support during the advancing periods automatic means for periodically releasing said steadying means, and means effective to automatically discontinue operation of the machine at the end of said cycle.

28. In a nailing machine, in combination, an automatic barrel advancing mechanism including a support for the barrel adapted to be rotated step by step to complete a cycle of operations, means adapted to steady the barrel upon the support during the advancing periods, means adapted to effect release of the last mentioned means following each advancing period, and means effective to automatically discontinue operation of the machine at the end of said cycle of operations.

29. In a nailing machine, in combination, an automatic barrel advancing mechanism including a support for the barrel adapted to be rotated step by step to complete a cycle of operations, means adapted to steady the barrel upon the support during the advancing periods, control means adapted to effect release of the last mentioned means following each advancing operation, said control means including a rotatable element, driving mechanism for said rotatable element, and means adapted to automatically render said driving means ineffective and to prevent overrunning of said rotatable element at the end of said cycle of operations.

30. In a nailing machine, in combination, an automatic barrel advancing mechanism including a support for the barrel provided with means for rotating it step by step to complete a cycle of operations, releasable means adapted to steady the barrel upon its support during the advancing operations, control means adapted to effect release of the last mentioned means following each advancing operation, said control means including a rotatable element, driving mechanism for said rotatable element including a clutch, a device for rendering the clutch ineffective, said device being normally prevented from operation by said rotatable element and released thereby when said cycle of operations is completed, and manually controlled means for resetting said last mentioned device to permit continued operation of the clutch and driving mechanism.

31. In a nailing machine, in combination, an automatic barrel advancing mechanism including a support for the barrel provided with means for rotating it step by step to complete a cycle of operations, a device for steadying the barrel upon the support during the advancing operations, means for automatically effecting the release of said steadying device following each period of advancement, and common means for actuating said last mentioned means and said barrel advancing mechanism.

32. In a nailing machine, in combination, an automatic barrel advancing mechanism including a rotatable support for the barrel adapted to be advanced step by step to complete a cycle of operations, releasable gripping means for steadying the barrel during each advancing operation, a rotatable element adapted to effect release of said gripping means following each period of advancement of the barrel, driving means for said rotatable element including a normally active clutch releasable to render the driving means ineffective, a control device for releasing said clutch, means connected with said rotatable element adapted to normally prevent operation of said control device but permitting it to operate to release the clutch at the end of said cycle of operations, and manually operable means for resetting said control device to permit continued operation of the driving device.

33. In a nailing machine, in combination, an automatic barrel advancing mechanism including a rotatable support for the barrel adapted to be advanced step by step to complete a cycle of operations, releasable gripping means for steadying the barrel during each advancing operation, a rotatable element adapted to effect release of said gripping means following each period of advancement of the barrel, driving means for said rotatable element including a normally active clutch releasable to render the driving means ineffective, a control device for releasing said clutch, means connected with said rotatable element adapted to normally prevent operation of said control device but permitting it to operate to release the clutch at the end of said cycle of operations, and means interposed between said releasable gripping means and said control device adapted to be actuated by the latter to move the gripping means from the extreme release position into position to be acted upon by said rotatable element.

34. In a nailing machine, in combination, an automatic barrel advancing mechanism including a rotatable support for the barrel adapted to be advanced step by step to complete a cycle of operations, a pivoted member, a spring tending to move said member in one direction, a rotatable element acting to move it in the opposite direction, said member having a gripping device adapted in one of its positions to engage the barrel to steady it upon the support, said rotatable element being adapted to move the pivoted member to effect release of said gripping device following each period of advancement of the barrel, actuating means for said rotatable element, and means controlled by the rotatable element adapted to render the actuating means ineffective at the end of said cycle of operations.

35. In a nailing machine, in combination, an automatic barrel advancing mechanism including a support for the barrel adapted to be advanced step by step to complete a cycle of operations, means for steadying the barrel during each advancing period including a pivoted member having a gripping device for engaging the barrel, a rotatable element having a series of recesses and intermediate portions for engaging the pivoted member to hold the gripping device in contact with the barrel, a spring for urging the pivoted member against said rotatable element, said pivoted member being adapted when moved into said recesses to effect release of the gripping device following each period of advancement of the barrel, driving means for said rotatable element, a releasable controlling device adapted when released to render said driving means ineffective, a member connected with said rotatable element and normally preventing operation of said releasable controlling device but adapted to release the same at the end of said cycle of operations, and manually controlled means for resetting said control device to permit continued operation of said driving means.

36. In a nailing machine, in combination, a frame, a carriage adjustable upon the frame and provided with an arm, a spindle journaled within the arm, an anvil carried by the spindle and adapted to engage the inside face of the bottom of a keg inserted upon the arm, gripping means adapted to engage the outer face of the keg bottom to cooperate with the anvil in advancing the keg, means for effecting a step by step advancement of the spindle, and mechanism for releasing the gripping means following each step of advancement of the spindle.

37. In a nailing machine, in combination, a frame including an arm, a spindle journaled upon the arm, an anvil carried by the spindle and adapted to engage the inside face of the bottom of a keg inserted upon the arm, gripping means adapted to engage the outer face of the keg bottom to cooperate with the anvil in advancing the keg, means for effecting a step by step advancement of the spindle, mechanism for releasing the gripping means following each step of advancement of the spindle, and means connected with the arm adapted during withdrawal of the keg therefrom to cause it to move in a path at an angle to the axis of the spindle.

38. In a nailing machine, in combination, a frame including an arm, a spindle journaled within the arm, an anvil carried by the spindle and adapted to engage the inside face of the bottom of a keg inserted upon the arm, gripping means adapted to engage the outer face of the keg bottom to cooperate with the anvil in advancing the keg, means for effecting a step by step advancement of the spindle, and a guard adapted when the keg is withdrawn from the anvil to prevent interference with its removal by the gripping means.

39. In a nailing machine, in combination, a frame, a crank shaft journaled thereon, a barrel supporting spindle, an anvil thereon, means operatively connecting the crank shaft with the spindle to advance it step by step, releasable gripping means for steadying the barrel upon the anvil, a rotatable controlling device adapted to effect the release of the gripping means following each period of advancement of the barrel, driving mechanism for said control device adapted to be actuated by said crank shaft, said driving mechanism including a normally active clutch, a clutch release mechanism for rendering the clutch ineffective following a predetermined number of barrel advancing operations, and means rotatable with said control device and normally preventing operation of said clutch release mechanism but adapted to release the same upon completion of said predetermined number of advancing operations.

40. In a nailing machine, in combination, a frame, a crank shaft journaled thereon, a barrel supporting spindle, an anvil thereon, means operatively connecting the crank shaft with the spindle to advance it step by step, releasable gripping means for steadying the barrel upon the anvil, a rotatable controlling device adapted to effect the release of the gripping means following each period of advancement of the barrel, driving mechanism for said control device adapted to be actuated by said crank shaft, said driving mechanism including a normally active clutch, a clutch release mechanism for rendering the clutch ineffective following a predetermined number of barrel advancing operations, means rotatable with said control device normally preventing operation of said clutch release mechanism but adapted to release the same upon completion of said predetermined number of advancing operations, and a nailing device adapted to be actuated by said crank shaft in unison with said barrel advancing operations.

41. In a nailing machine, in combination, a frame including an arm, a spindle journaled within the arm, an anvil carried by the spindle and adapted to engage the inside face of the bottom of a keg inserted upon the arm, gripping means adapted to engage the outer face of the keg bottom to cooperate with the anvil in advancing the keg, means for effecting a step by step advancement of the spindle, mechanism for releasing the gripping means following each step of advancement of the spindle, and a nailing device timed to operate upon the keg in unison with said advancing operations.

HENRY W. MORGAN.